United States Patent [19]

Farstad et al.

[11] Patent Number: 5,361,636
[45] Date of Patent: Nov. 8, 1994

[54] APPARATUS AND PROCESS FOR MEASURING THE MAGNITUDE OF LEAKS

[75] Inventors: Jerry E. Farstad, Columbus; Stephen P. Cremean, Gahanna, both of Ohio

[73] Assignee: Columbia Gas of Ohio, Inc., Columbus, Ohio

[21] Appl. No.: 948,597

[22] Filed: Sep. 23, 1992

[51] Int. Cl.⁵ .................................................. G01M 3/24
[52] U.S. Cl. ................................... 73/592; 73/40.5 A
[58] Field of Search ................ 73/40.5 A, 592, 587; 376/252

[56] References Cited

U.S. PATENT DOCUMENTS

| | | | |
|---|---|---|---|
| 3,930,556 | 1/1976 | Kusuda et al. | 73/40.5 A |
| 4,066,095 | 1/1978 | Massa | 73/40.5 A |
| 4,736,763 | 4/1988 | Britton et al. | 73/592 |
| 4,785,659 | 11/1988 | Rose et al. | 73/40.5 A |
| 4,823,600 | 4/1989 | Biegel et al. | 73/592 |
| 4,958,296 | 9/1990 | Saitoh et al. | 73/40.5 A |
| 5,136,876 | 8/1992 | Taylor | 73/40.5 A |

FOREIGN PATENT DOCUMENTS

| | | | |
|---|---|---|---|
| 38284 | 3/1977 | Japan | 73/40.5 A |
| 141637 | 5/1990 | Japan | 73/592 |

OTHER PUBLICATIONS

Physical Acoustics Corporation sales brochure, Leak Monitoring and Detection Systems.
A E International, Leak Detector brochure.

Primary Examiner—Hezron E. Williams
Assistant Examiner—Nashmiya Ashraf
Attorney, Agent, or Firm—Sidney W. Millard

[57] ABSTRACT

An accelerometer is attached to a pipe wall to measure the acoustic pressure waves generated in a fluid within the pipe as a result of a leak in a valve in the pipeline. Calibrating the accelerometer and tuning it to particular wave frequencies allows a determination of the magnitude of the leak through the valve.

20 Claims, 5 Drawing Sheets

APPARATUS AND PROCESS FOR MEASURING THE MAGNITUDE OF LEAKS

FIELD OF THE INVENTION

This invention relates to a method and apparatus for measuring the magnitude of leaks of fluid material through a closed valve in a pipeline.

BACKGROUND AND SUMMARY OF THE INVENTION

The motivation for this invention is to determine the magnitude of leaks of natural gas through closed valves in a pipeline. The pressures used in transmission lines for natural gas are sufficiently high that every valve leaks to some extent. The major concern is the magnitude of the leak, since small leaks do not economically warrant repair.

It is not sufficient for the purposes of the industry to know whether or not a valve is leaking. It is known that the valve is leaking. To close down a pipeline for the purpose of repairing a leak in a valve may cost thousands of dollars, and economics may dictate that a repair of the leaking valve is not practical. For example, it may take $10,000 to $25,000 to close down a pipeline and repair a valve. Under circumstances where there is a leak of natural gas through a valve and the gas lost through the leak is worth only $2,000 or $3,000 per year, repair of the pipeline at a cost of $25,000 is not economically practical.

Various inventions have been developed which tell a user whether or not a leak exists in a pipeline. The leak might be in a valve or in the sidewall of the pipe. While this information is necessary, it is not sufficient for deciding whether or not to close down a pipeline to repair a given valve. There is an unmet need in the industry for a means to determine the flow rate of gas through a leaking valve so that informed economic decisions regarding whether or not to repair the valve can be made. With natural gas pipelines a leak through a sidewall must always be repaired immediately for safety reasons. Prior art apparatus which detects and locates leaks in sidewalls is adequate for this purpose.

Gas leaks create sound waves in the gaseous material; more specifically, leaks create sound waves in the gas in a pipeline downstream of the leak. These acoustic pressure waves may or may not be in the audible range, but their magnitude can be measured. In a pipeline, sound waves in the gas excite vibrations in the pipe sidewall, and these also can be measured. This invention measures the magnitude of leaks through a valve by measuring the downstream acoustic pressure waves or pipe wall vibrations. It has been determined that measurement of a particular frequency of waves and summation over a period of time gives a rough measure of the size of the leak. Laboratory experiments with leaks of known size provide a pattern for comparison with acoustic pressure waves measured in the field with a leak of unknown size. The field measurement is compared with laboratory data having known leak rates in similar conditions to approximate the leak rate of the valve in the field.

It will be understood that the invention described herein has a wider scope of use than merely natural gas pipelines and valves therein, but the best mode which will be described herein relates to natural gas. The theory explained below is applicable to both gases and liquids and the term fluids is intended to include both.

BRIEF DESCRIPTION OF THE DRAWINGS

FIG. 7 is a block diagram of the components of a leak detector according to this invention.

DESCRIPTION OF THE PREFERRED EMBODIMENTS

Internal leakage of gas through a closed valve in a pipeline can result in large volumes of gas bypassing a measurement station and thousands of dollars of lost revenue. Uncertainty of tight shutoff when the valve is used for safety purposes is inherently a problem. Broadly stated, this invention solves the problem of determining the flow rate of a leak through a closed valve by the disclosure of how to use data from acoustic pressure waves propagating downstream of a leak. Measurement in a designated frequency range, which range is outside the range produced by background flow noise is the key to allowing flow rate calculations.

Typically, pipeline valves do not have access taps on each side for direct leakage determination by tracer gas injection or other means. Most pipeline valves have no means of isolation from other pipeline components to permit leakage flow rates to be determined by measuring the rate of pressure increase or decrease on either side of the isolated valve.

This invention discloses apparatus and processes for measuring acoustic pressure waves downstream of a leaking valve and quantifying the leak flow rate based on the measurements. One direct way of measuring the acoustic pressure is with microphone probes projecting through the sidewall of the pipe. An alternative indirect way of measuring is with a sensing device to measure the radial motion of the pipe sidewall caused by acoustic waves in the gas propagating downstream from the leak. This latter does not require access to the pipe interior; it does require firm attachment of the sensor to the pipe sidewall by means such as adhesive bonding, silver solder, or the like.

From theory and laboratory measurements, it has been determined that the acoustic pressure level in a pipe downstream from a leaking valve is a function of the following variables: 1) the flow rate of fluid leaking through the valve, 2) measurement location downstream of the valve, 3) time averaged pressures upstream and downstream of the valve, 4) the inside diameter of the downstream pipe, 5) the effective diameter of the valve leak, and 6) the composition of the gas flowing in the pipeline. Therefore the leak flow rate can be estimated from an acoustic pressure measurement if the other parameters are known. It should be stated that if the pipe modal density is high in the analysis band, the effect of measurement location is minimal.

In practical field situations, the effective diameter through the valve is always unknown. The background noise level generated by flowing gas in adjacent pipelines is also unknown and is highly variable. These are some of the major reasons why existing acoustic techniques are successful only in detecting relatively large leaks and do not quantify leakage flow rate. The method and apparatus as described below take these factors into account and result in a quantification of leak rate.

Figure 1:
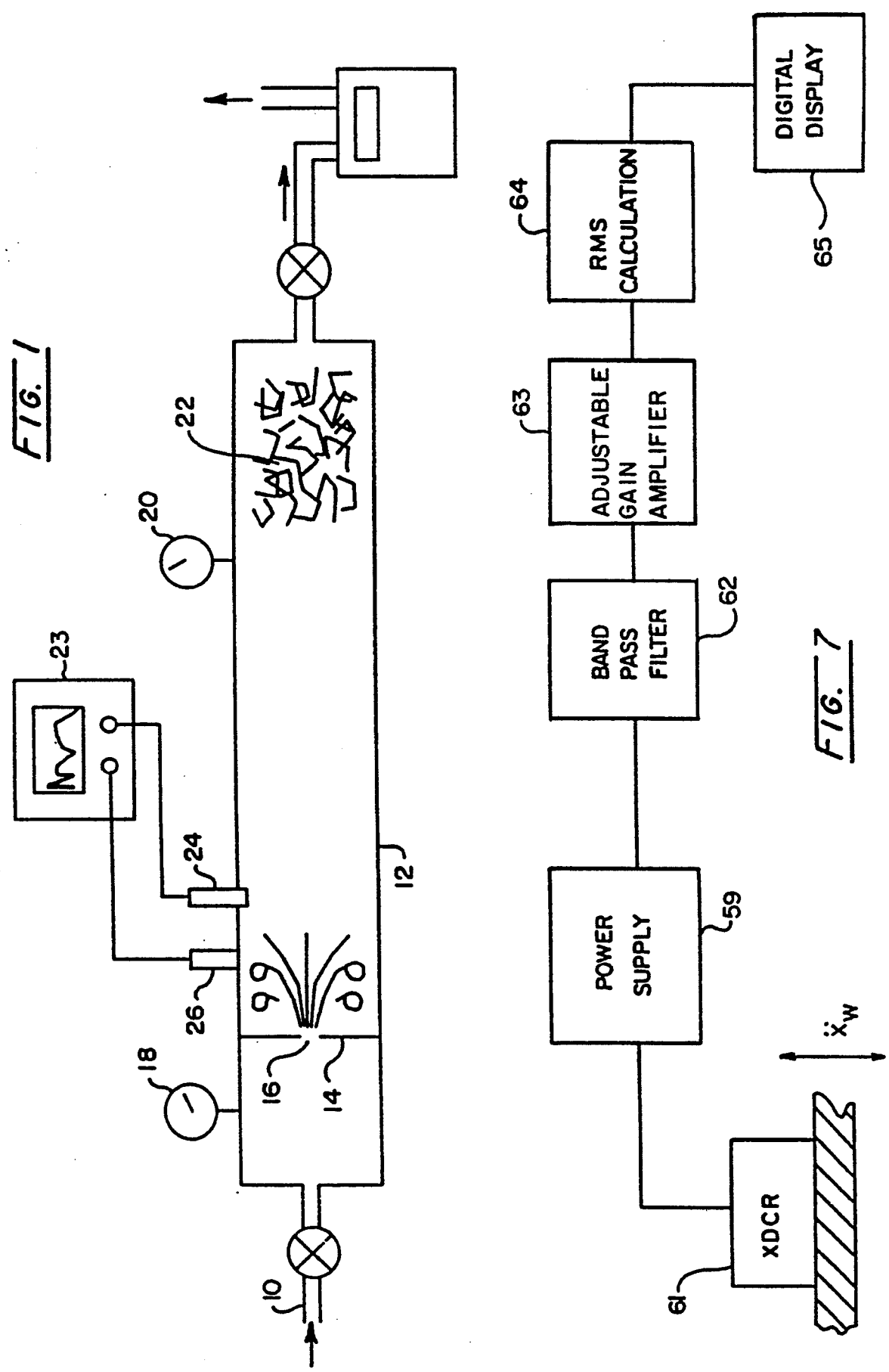
FIG. 1 is a schematic view of apparatus used for laboratory testing in establishing the empirical data upon which this invention is based.

Laboratory experiments were conducted on pipes from 1½ inch to 16 inch diameter with varying size orifices installed in an orifice fitting to simulate leakage through valves with different effective leak diameters. FIG. 1 shows the test setup for these experiments. A source of gas is fed through duct 10 into a pipe 12. Within pipe 12 is an orifice fitting 14 illustrated as a wall having an orifice 16 therein. In fact, the orifice fitting used allows the removal and insertion of various plates having different sizes of orifices to simulate different sizes of leaks in an existing valve. In laboratory tests the orifice 16 ranged from 1/32 to 3/32 of an inch.

Note that a pressure gauge 18 measures the pressure of the gas in pipe 12 upstream of orifice valve 14 and pressure gauge 20 measures the pressure of gas in pipe 12 downstream of orifice valve 14. The acoustic packing 22 at the downstream end of duct 12 is to eliminate reflection of the sound pressure wave created by the simulated leak through orifice 16 for purposes of the readings taken a spectrum analyzer 23. Note that the analyzer 23 shown being connected to two alternative probes. One probe 24 (microphone) projects to the interior of pipe 12 to directly measure the acoustic pressure waves propagating downstream from orifice 16 in the conventional cone-shaped pattern. The second probe 26 (an accelerometer) is an alternative and it is shown being secured to the surface of pipe 12 to measure radial motion of the sidewall of pipe 12 as a result of acoustic pressure waves propagating downstream from orifice 16. Probe 26 is an indirect measurement of the acoustic pressure waves. The two probes 24 and 26 on the same pipe 12 allow correlation of data from alternative measurements.

Internal acoustic pressure is measured for varying leak flow rates, upstream and downstream pressures, pipe inside diameters and orifice diameters. A condenser microphone may comprise probe 24 and is used with a digital spectrum analyzer 23 to measure acoustic pressure frequency spectra and overall pressure levels inside the pipe. An accelerometer 26 attached to the pipe wall is illustrated in FIG. 1 as an alternative to probe 24.

From dimensional analysis of the laboratory data, relationships have been determined between several combinations of dimensionless groups formed using the above six variables. The simplest and best relationship is summarized below in Equations 1-4 and is shown graphically in FIG. 2. This relationship includes the variables of acoustic pressure, leak flow rates, pressure drop, pipe ID and acoustic impedance of the gas. From this relationship, the leak flow rate can be estimated from measurement of the acoustic pressure level downstream of a suspect valve and from the other parameters which are either measured or known.

The principles of operation of this leak flow rate estimation apparatus and procedure are as follows: Since the sound pressure level inside the pipe downstream from the leaking valve depends to some degree on the unknown diameter of the leak, an empirical relation among the remaining variables in the flow/acoustical problem is sought. Dimensional analysis indicates that a solution to the problem involves two dimensionless groups of the remaining variables, if leak diameter is neglected.

All variables in the dimensionless groups were exercised over their expected ranges in natural gas pipeline operation, and orifices of several diameters were used to simulate pipeline valve leaks. The most useful relationship between dimensionless groups was found to be:

$$\text{LOG}\pi_1 = -1.50 + 1.67 \text{ LOG}\pi_2 \qquad (1)$$

or $$\pi_1 = .0316\ \pi_2^{1.67} \qquad (2)$$

where, $$\pi_1 = \frac{<p^2>}{(P_1 - P_2)^2} \qquad (3)$$

$<p^2>$ = internal space and time averaged mean square pressure acoustic pressure $$\pi_2 = \frac{G}{D^2 Z} \qquad (4)$$

Figure 2:
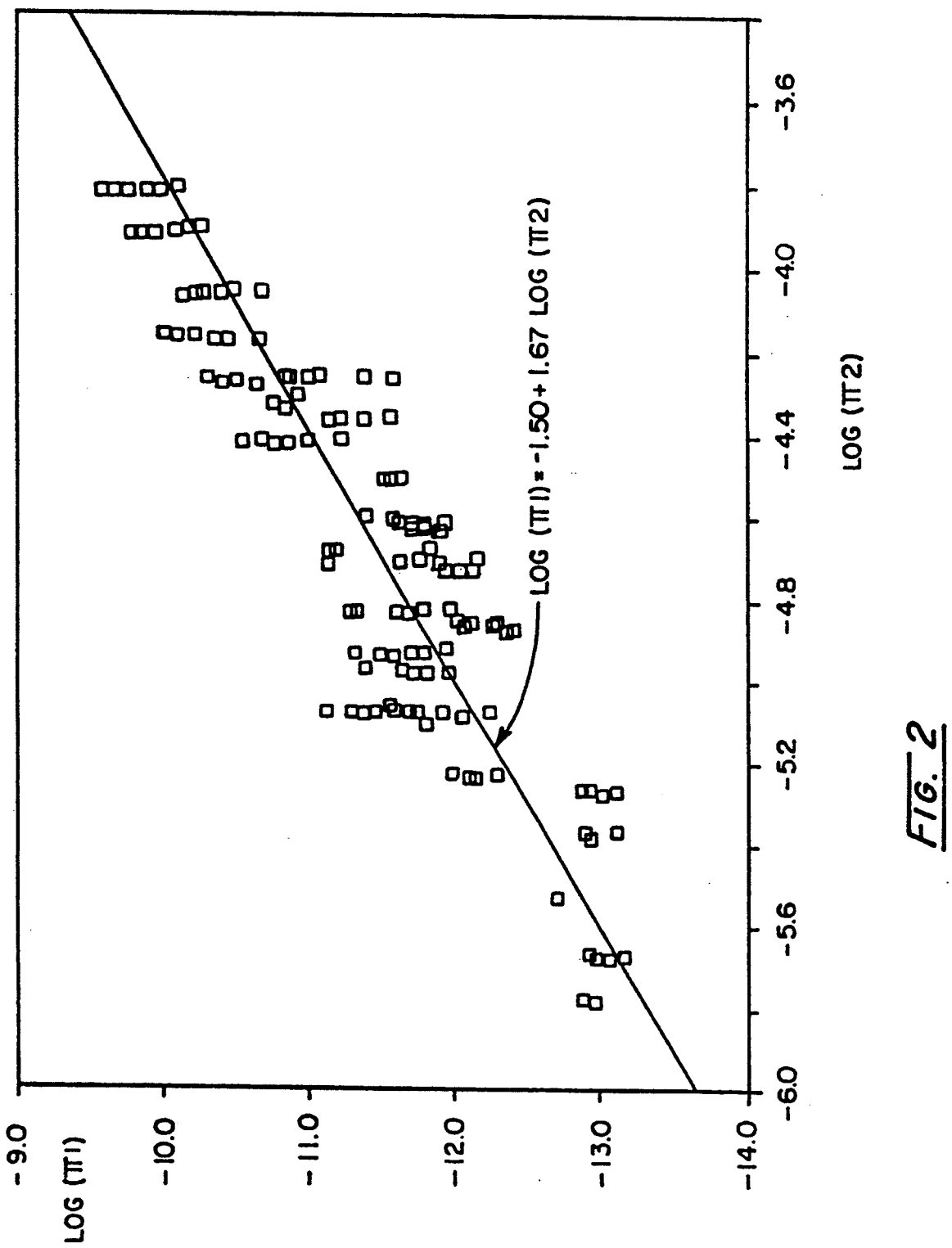
FIG. 2 is a graph of dimensionless variables which are comprised of the variables of sound pressure, leak flow rate, pressure drop, pipe inside diameter and acoustical impedance of the particular gas being tested.

$<P_a^2>_t$ = mean-squared acoustic pressure
$G$ = leak mass flow rate
$D$ = pipe inside diameter
$P_2$ = downstream mean pressure
$P_1$ = upstream mean pressure
$Z$ = fluid mean acoustic impedance A graph of this relation and the measured data are shown in FIG. 2. Consequently, if all quantities in the dimensionless groups except the leak flow rate G are known, then G may be computed from the equations (1)-(4).

The accuracy of the leak flow rate prediction is approximately a factor of two or three. The large inaccuracy is due to the variation of the effective leak diameter which was intentionally excluded from the analysis. It should be emphasized that the objective of the invention is not to develop a precise measurement instrument, but to develop an instrument that can *estimate* leak flow rates so that economic decisions on valve repair or replacement can be made. The accuracy of the apparatus and procedure meets this objective.

The laboratory results are based on internal acoustic pressure measurements resulting from leak flow only. Two problems still have to be addressed for the method to work in the field:

1) the effect of background noise due to flow in adjacent pipes, and
2) the lack of a pipe access tap to install an acoustic pressure sensor.

Figure 3:
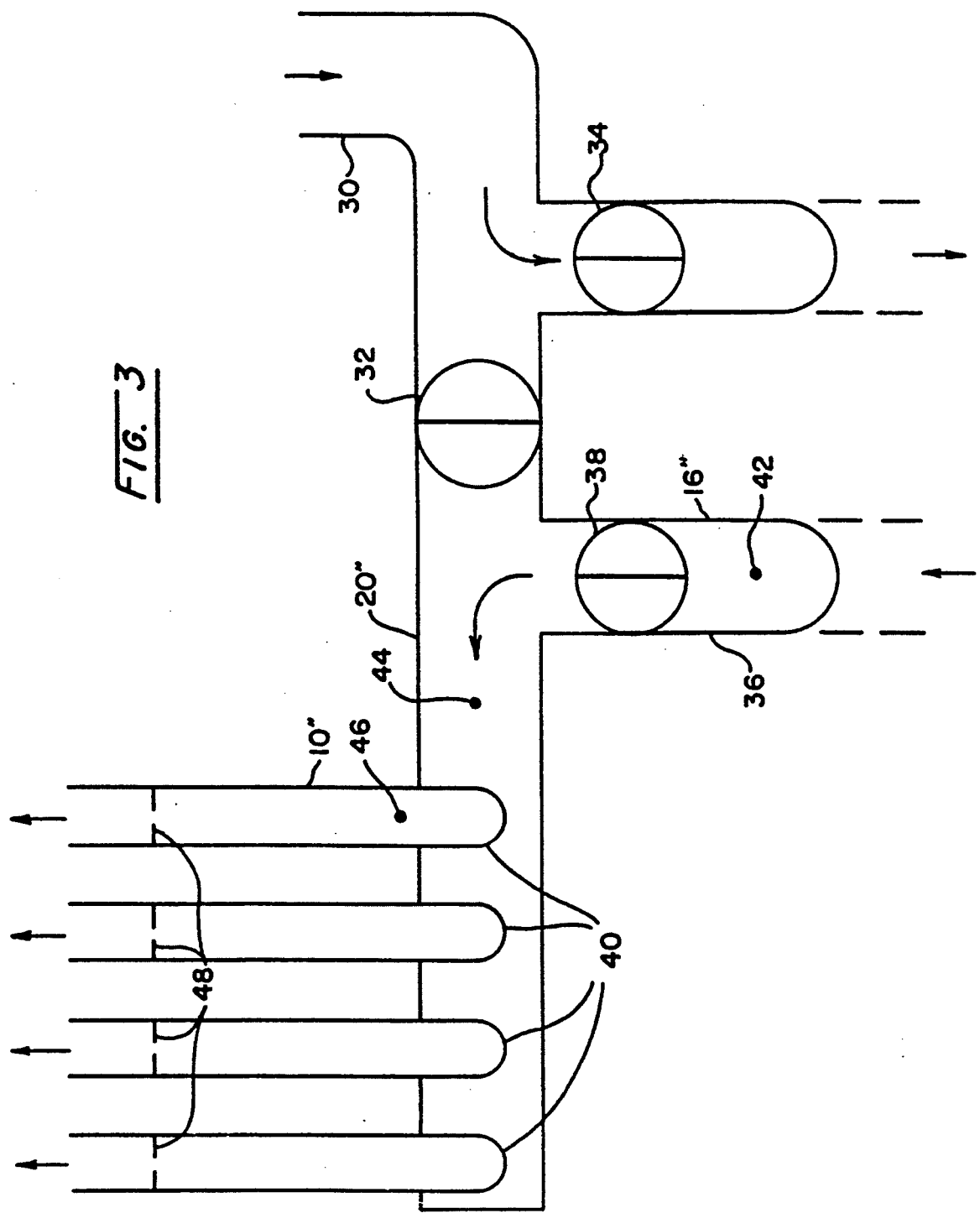
FIG. 3 is a schematic illustration of field test apparatus used in the testing of the inventive concept.

Field tests were conducted for the purpose of measuring acoustic pressure levels caused by background flow noise and to determine whether or not a frequency band could be selected to maximize the leak induced noise above this background flow noise. The field piping arrangement for these tests is illustrated in FIG. 3. FIG. 3 also shows the location of acoustic pressure sensors in these tests. Inflowing gas in tube 30 is blocked by valve 32 and forced through open valve 34 to a heater and is returned through duct 36 and open valve 38 to flow through a plurality of pipes 40. Various noise sensors 42, 44, 46 are schematically illustrated as measuring internal noise. Orifices 48 are mounted in each of the pipes 40 for measuring flow rate. Flow noise was measured in 10, 16 and 20 inch pipes at different flow rates by noise sensors 42, 44 and 46.

Figure 4:
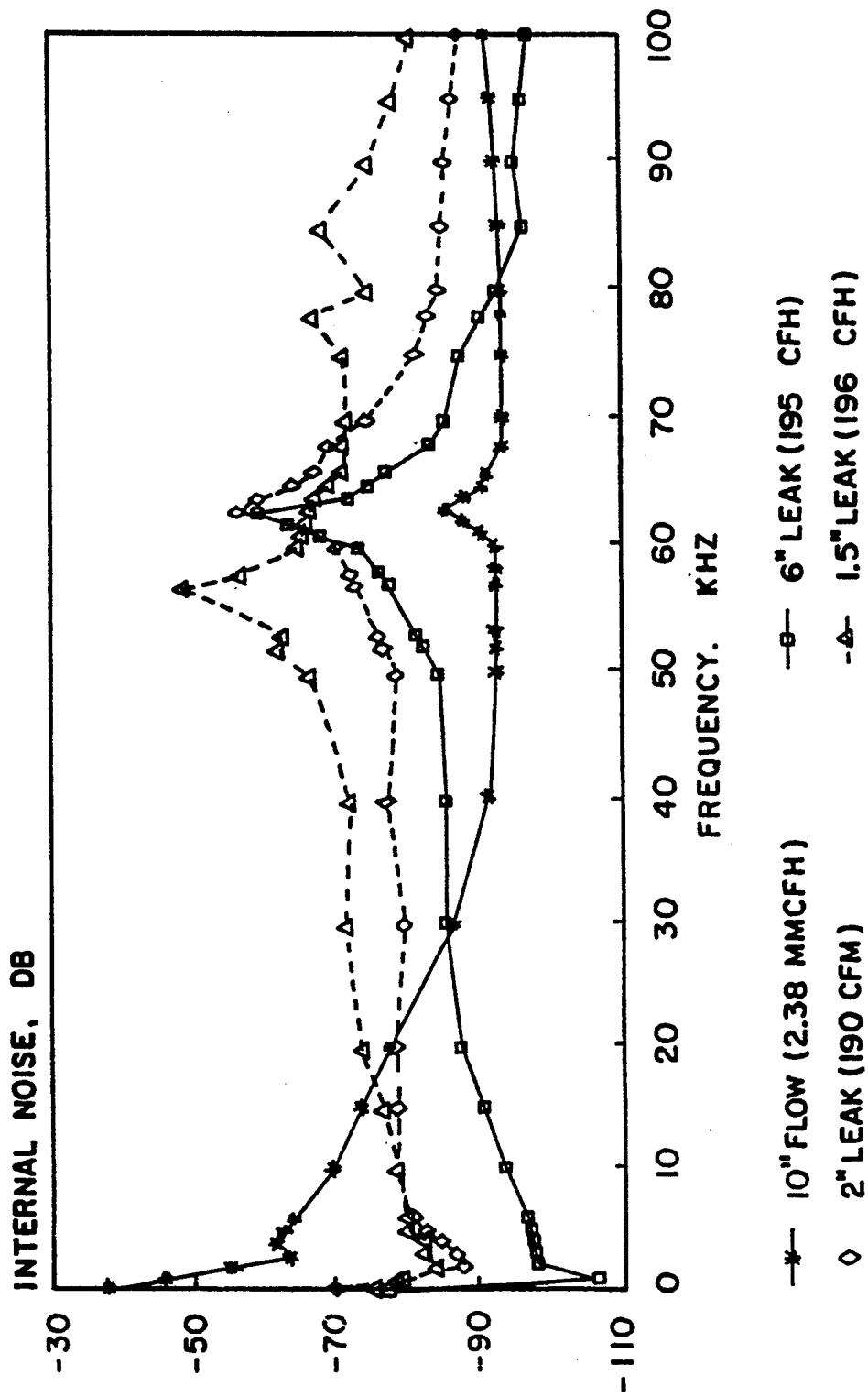
FIG. 4 is a graph of the measured flow noise as measured in field tests overlaid by leak induced noise as measured in lab tests.

FIG. 4 shows the spectra of flow noise from field tests overlaid by leak induced noise measured in lab tests. From FIG. 4, it is apparent that measurements must be made at frequencies above about 30 kHz if the leak noise is to be effectively extracted from the inherent background flow noise. Frequencies below about 20 kHz are in the audible range. A frequency band of 30 kHz to 40 kHz has been selected for a final instrument design to be used in natural gas applications and all relationships are based on measurements within this frequency range. Preferably the frequency selected is about 35 kHz but the purpose of selecting the range 30–40 kHz is to get beyond the background noise, see FIG. 4, but not too far beyond. The higher the frequency the lower the ability of acoustical apparatus to measure accurately. This effectively solves the first problem. That is, above about 30 kHz the acoustic pressure waves are uniquely leak induced and measuring only in that range allows a correlation with the magnitude of a leak through a given valve in the field.

To practically solve the second problem, the lack of a pipe access tap for internal sound pressure measurement, vibration measurements on the pipe exterior wall are necessary. To use exterior pipe wall vibration measurements to estimate internal acoustic pressure, the relationship between pipe wall vibration and acoustic pressure must be known. From vibration measurements on field piping installations and structural vibration theory, a relationship has been developed between pipe wall vibration and internal acoustic pressure.

A relation between the mean-squared acoustic pressure and the mean-squared pipe wall vibration is needed. If a frequency band for operation is chosen which contains a large number of structural natural frequencies of the pipe wall, then broad-band analysis techniques such as Statistical Energy Analysis may be used. An analysis of this type was performed and its result is that the mean-squared acoustic pressure and wall acceleration are related by $$<a^2> = <p^2> \left[ \frac{\sqrt{3}\, \pi C_o}{\rho_p C_L h^2 \rho_o} \right] \quad (5)$$

where, $C_L$ = longitudinal wave speed in the pipe material
$Q_p$ = pipe wall density
$h$ = pipe wall thickness
$Q_o$ = fluid mean density
$C_o$ = fluid mean speed of sound
$<p^2>$ = internal space and time averaged mean square acoustic pressure
$<a^2>$ = space and time averaged mean square pipe wall acceleration Consequently, if the space and time average mean square acceleration of the pipe wall $<a^2>$ is measured, $<p^2>$ may be determined from equation (5). With the measured mean pressure values, the group $\pi_1$ may be computed. The corresponding value of $\pi_2$ may be determined from equations (2) or (4) or FIG. 2. From the value of $\pi_2$ the flow rate of fluid flowing through the leak G may be computed.

From structural tests it has been determined that the pipe sizes of practical interest do indeed have a very large number of natural frequencies in the 30 kHz–40 kHz frequency band. Thus, the total pipe vibration response over this frequency band is predicted well by the average value of the wall vibration/acoustic pressure response function in equation (5). This response function is the vibration/pressure response function of an infinite flat plate made from the same material as the pipe wall and of the same thickness. Hence, if the total response in the 30 kHz–40 kHz range is used, the relationship between pipe wall vibration and internal acoustic pressure developed above is not sensitive to variations in installation geometrics. It is also relatively insensitive to the location of the vibration transducer on the pipe.

Early experimental work conducted on steel pipes of ten to twenty inches in diameter, at a natural gas measurement station, see FIG. 3, showed that all pipes considered had a large number of vibratory modes with natural frequencies in the 0–25 kHz band. Modal damping ratios of approximately 0.001–0.01 were observed, with the half-power bandwidth being uniform among modes for most cases. In fact, the modal density is sufficiently great that the pipe wall vibration spectra tends to be variance of approximately 10 dB in the 30–40 kHz band when excited by a diffuse internal pressure field. Calculations reveal that in the 30–40 kHz band all pipes from 4 inches to 30 inches diameter have rather high modal density, and that the "ring" frequency for all of these cases is far below 30 kHz. Laboratory experiments show that the pipe internal acoustic pressure field is virtually uncorrelated spatially, as signals from microphones only one inch apart are completely incoherent. These facts suggest that a broad-band approach for structural-acoustical interaction such as Statistical Energy Analysis (SEA) is appropriate, and that the mean value of the pipe wall response may be reliably estimated by considering the pipe wall structural properties to be identical to those of an infinite plate of the same thickness and material.

Measurements have revealed that the acoustic pressure inside a pipe due to a leak has a broad-band dependence on frequency, and that the acoustic pressure level tends to decrease with increasing frequency. Consequently, the sensitivity of the instrument is maximized by selecting a band with as low a frequency as is practical. Unfortunately, tests made on natural gas transmission pipelines have indicated that the noise generated by gas flowing in pipes adjacent to the leaking valve often produces acoustic pressures significantly greater than those due to a leak, and may mask the noise produced by even a relatively severe leak. The internal sound pressure caused by the flowing fluid is also of broad-band character, but the rate at which the flow generated noise decreases with frequency is much greater than the rate at which the noise due to the leak decreases. Under most circumstances, the equality of (1) sound pressure levels due to a relatively small leak and (2) maximum design flow in an adjacent pipe are at approximately 20 kHz, and the leak signal is greater than the background flow noise signal by at least 10 dB at frequencies above 30 kHz. Consequently, an analysis band above 30 kHz is chosen to render the instrument relatively insensitive to background noise caused by flowing fluid in adjacent pipelines.

Steel pipes of two inch or greater diameter are known to have more than fifty natural frequencies in the band from 30 kHz to 40 kHz. Hence, in this band the assumptions of broad-band analysis procedures such as SEA are valid, and the relatively simple relation of equation (5) may be used reliably to compute the total mean-squared acoustic pressure over the 30–40 kHz band from the pipe wall acceleration measured in the same band. At these high frequencies, the high modal density of the pipe wall also ensures that the broad-band wall acceleration measurement is very insensitive to location of the transducer downstream from the pipe or the specific geometric details of a particular pipe/valve system.

SEA is used to determine the response of an infinite plate to a spatially uncorrelated pressure field of uniform mean. The result is the following relation between internal acoustic pressure and wall vibration:

$$<a^2> \, = \, <p^2> \left[ \frac{\sqrt{12} \, \pi c_0}{2 \rho_p c_l h^2 \rho_0} \right] \left[ 1 + \left( \frac{\eta_2 \rho_p h \omega}{\rho_0 c_0 \sigma_{rad}} \right) \right]^{-1} \quad (6)$$

where,
$<a^2>$ is the mean-squared pipe wall acceleration,
$<p^2>$ is the mean-squared acoustic pressure,
$h$ is the pipe wall thickness,
$c_0$ is the sonic velocity of the gas inside the pipe,
$c_l$ is the plate longitudinal wave speed,
$\rho_0$ is the gas density,
$\rho_p$ is the pipe wall density,
$\omega$ is the center frequency of the analysis band,
$\eta_2$ is the loss factor for the pipe structural modes, and
$\sigma_{rad}$ is the radiation efficiency of the pipe wall, which is nearly unity in the 30–40 kHz band.

In many cases, the structural loss factor is sufficiently low that the term raised to the power of $-1$ is nearly one. For this case, the somewhat simpler relation $$<a^2> \, = \, K <p^2> \left[ \frac{\sqrt{12} \, \pi c_0}{2 \rho_p c_l h^2 \rho_0} \right] \quad (7)$$

may be used where the factor K is such that $0 < K < 1$. Initially, $K=1$ should be used. If needed, a more suitable value for K may be determined empirically. Since damping does not vary greatly among installations, it should be possible to determine an average value for K suitable for all cases.

Figure 5:
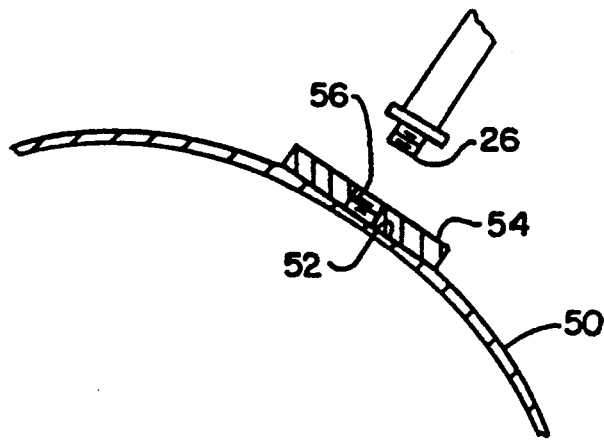
FIG. 5 is a fragmentary sectional view of a lug secured to a flat surface on a pipe.
Figure 6:
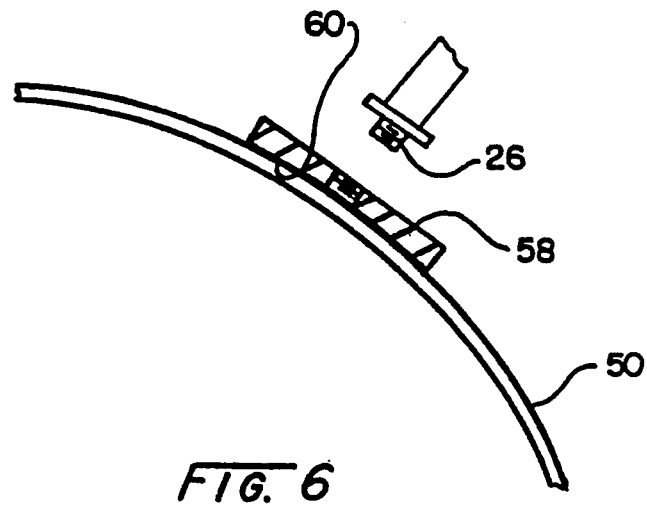
FIG. 6 is a fragmentary sectional view similar to FIG. 5 except that the pipe surface does not have a flat area and the lug is curved corresponding to the curved surface of the pipe exterior wall.

Sensor selection and mounting to the pipe wall are critical for accurate measurement of pipe wall vibration at the relatively high frequency range of interest. Either accelerometers or acoustic emission sensors could be used for this measurement. Sensitivities of acoustic emission sensors are highly frequency variable and poorly quantified, so accelerometers are generally a better choice for quantitative measurement consistency. However, accelerometer sensitivity decreases with the upper limit of flat frequency response which for many commercially available sensors is generally well below 30 kHz. Mounting the sensor to the pipe wall also becomes a critical factor at these high frequencies. Normally, accelerometers are adhesively bonded to the pipe wall but for accurate vibration measurement at high frequencies, the sensor sometimes has to be threaded to a stud or nut welded to the pipe wall to insure that there is no relative motion. FIGS. 5 and 6 illustrate alternative transducer mounting arrangements which may be welded, silver soldered, or adhesively resin bonded to the pipe surface. Silver solder of the plate to the pipe wall is preferred.

FIG. 5 illustrates a pipe wall 50 having a flat area 52 approximately three-quarters of an inch in diameter. The flat surface may be achieved by grinding the exterior surface of the pipe wall 50 in a location where it is desirable to mount a threaded lug 54. The lug 54 is bonded to the pipe wall by any of the aforementioned securing means. It includes a centrally located threaded aperture 56 to accommodate the probe 26, which is correspondingly threaded.

FIG. 6 shows structure similar to FIG. 5 where the pipe wall 50 is not ground flat, but the lug 58 is curved at its inner surface 59 with a radius corresponding to that of the exterior surface of pipe wall 50 to enhance the firm fit of the lug when the bonding takes place.

What is particularly important is that the mounting lugs 54, 58 be secured to the pipe wall so that the lug moves with the pipe wall in response to the acoustic pressure waves of the gas inside the pipe. Inherently, the degree of radial displacement is extremely small and anything less than a rigid connection between the lug and the pipe wall creates a false reading in the analyzer 23.

The sensing instrument consists of a power supply 59, a transducer (accelerometer) 61, a bandpass filter 62, an adjustable gain amplifier 63 and a root mean square (RMS) voltage meter 64. A general schematic of the instrumentation is shown in FIG. 7 with the result displayed digitally at 65. Specifications for the accelerometer 61 are shown in Table 1.

The signal conditioning and read out module of the instrument is illustrated in FIG. 7. Since only the mean-squared value of the accelerometer signal over the 30–40 kHz band is needed, the module is to contain a band-pass electrical filter tuned to the 30–40 kHz range and a simple mean-square or true RMS volt meter. The volt meter may be either analog or digital. The module shall also contain any power supply needed for operation of the accelerometer. An instrumentation amplifier with user selectable gains of 0, 20, or 40 dB is also to be included.

TABLE 1

Transducer Specifications:
Type - Tuned, narrow band accelerometer.
Center frequency - ~35 kHz
Fla - Bandwidth (±3 dB) - 5–10 kHz
Resolution - $10^{-4}$ g ($10^{-5}$ better)
Dynamic Range - 80 dB
Specifications @ 25° C.

| | Minimum | Maximum | Units |
|---|---|---|---|
| DYNAMIC | | | |
| Sensitivity @ 100 Hz | 270 | 330 | mV/g |
| Acceleration range | — | 10 | g peak |
| Dynamic range (30 kHz–40 kHz) | 110 | — | dB |
| Amplitude nonlinearity | — | 1 | % |
| Frequency response | | | |
| ±1 dB | 15 | — | kHz |
| ±3 dB | 35 | — | Hz |
| Deviation, 30 kHz to 40 kHz | — | ±3 | dB re |

TABLE 1-continued

Transducer Specifications:
Type - Tuned, narrow band accelerometer.
Center frequency - ~35 kHz
Fla - Bandwidth (±3 dB) - 5–10 kHz
Resolution - $10^{-4}$ g ($10^{-5}$ better)
Dynamic Range - 80 dB
Specifications @ 25° C.

|  | Min-imum | Max-imum | Units |
|---|---|---|---|
| Resonance, mounted | 65 | 7 | 35 kHz kHz |
| Transverse sensitivity | — | 10 | axial |
| ELECTRICAL | | | |
| Power requirement | 18 | 30 | VDC |
| Current regulating diode | 2 | 10 | mA |
| Electrical noise, 30 kHz to 40 kHz | — | 30 | µg |
| Spectral noise, 30 kHz to 40 kHz | 0.3 | — | µg/√Hz |
| Output impedance | — | 100 | Ω |
| Bias output voltage | 10 | 14 | VDC |
| Grounding | | | Case Grounded |
| ENVIRONMENTAL | | | |
| Temperature range | 80 | — | °C. |
| Humidity rating | 100 | — | % relative |
| PHYSICAL | | | |
| Weight | — | 15 | grams |
| Case material | | | 316L Stainless Steel |
| Mounting | | | Adhesive |
| Output connector | | | Hermetic 10-32 microdot |
| Connector location | | | Top mounted |
| Sealing | | | Welded |
| DIMENSIONS | | | |
| Height (including connector) | — | 1.06 | in |
| Diameter | — | 0.5 | in |
| Dimension across wrench flats | — | 0.50 | in |

Figure 8:
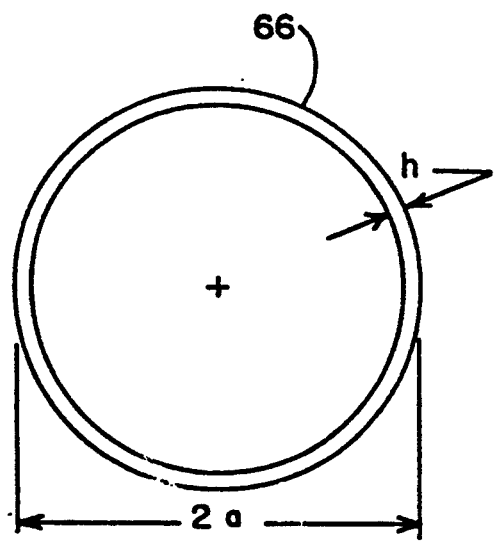
FIG. 8 is a sectional view of a pipe which transmits gas.

For completeness the following analysis is included to illustrate the reasoning that under the circumstances where this invention is to perate a cylindrical pipe operates as a flat plate of identical thickness with respect to acoustic vibrations. There are really two approaches for coming to the same conclusion and they are identified below. Attention is directed to FIG. 8.

Approach I—Statistical Analysis

Major assumptions:

(1) Pipe 66 is thin so that $h<<a$.

(2) There are a large number of vibrational and acoustical modes in the frequency range of interest, $\Delta\omega$.

(3) $\Delta\omega$ is above the pipe "ring" frequency so that $\Delta\omega = \{\omega:\omega>\omega_r\}$; $\omega_r = C_L/2\pi a$, where $C_L$ is the longitudinal speed of the pipe material.

$$C_L = \sqrt{\frac{E_p}{\rho_p(1-\nu^2)}} \tag{8}$$

where,
$E_p$ = Young's modulus (N/m²)
$Q_p$ = Pipe material density (kg/m³)
$\nu$ = Poisson's ratio ($\nu \approx 0.3$ for steels)
$C_L$ = longitudinal wave speed (m/sec)

(4) Damping in both structural and acoustical systems is small (including external acoustic radiation).

(5) Membrane stiffness increase due to mean internal pressure may be neglected in the frequency range of interest, $\Delta\omega$.

Previous work has shown assumptions 1–3 and 5 to be valid for all pipe sizes of interest.

Consider the following:

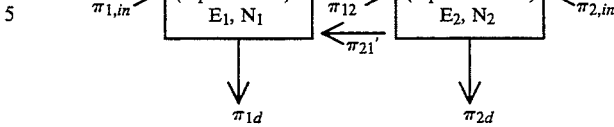

where,
$E_i$ = total energy in $\Delta\omega$ for system i.
$N_i$ = number of modes in system i in $\Delta\omega$.
$\pi'_{ij}$ = power flow from system i to system j.
$\pi_{i,in}$ = external power supplied to system i.
$\pi_{id}$ = power dissipated in system i.

Using Statistical Energy Analysis (SEA), $$\pi'_{12} = E_1 \omega \eta_{12}, \tag{9}$$

$$\pi'_{21} = E_2 \omega \eta_{21}, \tag{10}$$

where $\omega$ is the center frequency of $\Delta\omega$, and $\eta_{12}$ and $\eta_{21}$ are coupling loss factors such that $$N_2 \eta_{21} = N_1 \eta_{12}. \tag{11}$$

Net power transfer:

$$\Pi_{12} = \Pi_{12}' - \Pi_{21}' \tag{12}$$
$$= \omega(E_1 \eta_{12} - E_2 \eta_{21}) \tag{13}$$
$$= \omega \eta_{21} N_2 \left( \frac{E_1}{N_1} - \frac{E_2}{N_2} \right) \tag{14}$$

Power dissipated by damping is $$\pi_{1d} = E_1 \omega \eta_1, \tag{15}$$

$$\pi'_{2d} = E_2 \omega \eta_2, \tag{16}$$

where $\eta_2$ is the damping loss factor for system 2.

$$\left. \begin{array}{l} \Pi_{1,i} = \Pi_{1d} + \Pi_{12} \\ \Pi_{2i} + \Pi_{12} = \Pi_{2d} \end{array} \right\} \tag{17} \tag{18}$$

For the case being considered, only the pipe internal cavity is directly excited by the leak. Hence, $_{2i}=0$. From this, it follows that, $$\frac{E_2}{E_1} = \frac{N_2}{N_1} \left( \frac{\eta_{21}}{\eta_{21} + \eta_2} \right). \tag{19}$$

$$=> \frac{E_2}{E_1} = (N_2/N_1) \left( \frac{1}{1 + \eta_2/\eta_{21}} \right) \tag{20}$$

Energies are, $$E_1 = \frac{<p^2>}{\rho_o C_o^2} U \tag{21}$$

$$E_2 = <v^2> \rho_p h S. \tag{22}$$

where,
$<p^2>$ = time and space averaged mean-square acoustic pressure inside the pipe.

$<v^2>$ = time and space averaged mean-square velocity of the pipe wall.
U = pipe interior volume.
S = pipe wall area.

For this case, observe that $\pi'_{21}$ is the acoustic power radiated from the pipe wall back into the cavity. Hence, $$\pi'_{21} = \pi_{rad} = <v^2>\rho_o C_o \sigma_{rad} S \qquad (23)$$

$$=> E_2 \omega \eta_{21} = <v^2>\rho_p h S \omega \eta_{21} = <v^2>\rho_o C_o \rho_{rad} S \qquad (24)$$

where,
$\rho_o$ = gas density (kg/m³)
$C_o$ = gas acoustic velocity (m/sec)
$\sigma_{rad}$ = wall radiation efficiency, $\sigma_{rad} \in [0,1]$.

In the high frequency range of interest, $\sigma_{rad} \approx 1.0$. Solving for the coupling loss factor, $$\eta_{21} = \frac{\rho_o C_o \sigma_{rad}}{\rho_p h \omega} \qquad (25)$$

For the pipe structure and interior:

$$N_1/\Delta\omega = \frac{\omega^2 U}{2\pi^2 C_o^3} \qquad (26)$$

$$N_2/\Delta\omega = \frac{\sqrt{12}\, S}{4\pi C_L h} \qquad (27)$$

Hence, $$N_2/N_1 = \frac{\sqrt{12}\,\pi C_o^3}{2 C_L h \omega^2} \left(\frac{S}{U}\right) \qquad (28)$$

and, $$E_2/E_1 = \frac{<v^2>\rho_p h \rho_o C_o^2}{<p^2>} \left(\frac{S}{U}\right) \qquad (29)$$

Hence, $$\frac{<v^2>}{<p^2>}(\rho_p h \rho_o C_o^2) = \frac{\sqrt{12}\,\pi C_o^3}{2 C_L h \omega^2} \left[\frac{1}{1 + \left(\frac{\eta_2 \rho_p h \omega}{\rho_o C_o \sigma_{rad}}\right)}\right] \qquad (30)$$

$$\rightarrow <v^2> = <p^2> \left[\frac{\sqrt{12}\,\pi C_o}{2\rho_p C_L h^2 \rho_o \omega^2}\right] \left[\frac{1}{1 + \left(\frac{\eta_n \rho_p h \omega}{\rho_o C_o \sigma_{rad}}\right)}\right] \qquad (31)$$

Since the mean-squared pipe wall accelerator is, $$<a^2> = \omega^2 <v^2>, \qquad (32)$$

$$<a^2> = <p^2> \left[\frac{\sqrt{12}\,\pi C_o}{2\rho_p C_L h^2 \rho_o}\right] \left[\frac{1}{1 + \left(\frac{\eta_2 \rho_p h \omega}{\rho_o C_o \sigma_{rad}}\right)}\right] \qquad (33)$$

If the pipe structural damping is sufficiently low that $$\eta_2 \rho_p h \omega < \rho_o C_o \sigma_{rad} \qquad (34)$$

then, $$<a^2> = <p^2> \left[\frac{\sqrt{12}\,\pi C_o}{2\rho_p C_L h^2 \rho_o}\right] \qquad (35)$$

It is suggested that this form be used.

Note that this form will predict too great an acceleration if the low pipe structural damping assumption is violated. If measured values seem to be too low, it may be possible to determine typical values for the quantity $$\left[1 + \left(\frac{\eta_2 \rho_p h \omega}{\rho_o C_o \sigma_{rad}}\right)\right]^{-1} \qquad (36)$$

from experiment and use these to improve estimate for $<a^2>$.

Approach II—Infinite Plate Green's Function

For an infinite plate of thickness h driven by a pressure distribution p(x,y), the velocity at any point may be obtained by integration of the 2-D Green's function $$G(x,y;\xi,\eta) = \frac{1}{Z_\infty} \pi(k \sqrt{(x-\xi)^2 + (y-\eta)^2}) \qquad (37)$$

where, $$Z_\infty = 2.31 \rho_p C_L h^2 \quad \text{infinite plate point —} \atop \text{load input impedance)} \qquad (38)$$

$$k = \left[\frac{\omega^2 \rho_p h}{D}\right]^{\frac{1}{4}} \quad \text{(bending wave number)}$$

$$D = \frac{E_p h^3}{12(1-\nu^2)} \quad \text{(bending stiffness)} \qquad (40)$$

and $\pi$ (Z) is the radiation function given by, $$\pi(Z) = H_o^{(2)}(Z) - H_o^{(2)}(-jZ), \qquad (41)$$

where $j = \sqrt{-1}$ and $H_o^{(2)}(Z)$ is the function of the second kind of order zero. Hence, the velocity field is $$v(x,y) = \qquad (42)$$

$$\frac{1}{Z_\infty} \int_{-\infty}^{\infty} \int_{-\infty}^{\infty} P(\xi,\eta) \Pi(k\sqrt{(x-\xi)^2 + (y-\eta)^2})\, d\xi\, d\eta$$

Since the pressure field in the pipe is diffuse, we use $$p(\xi,\eta) = \sqrt{<p^2>} \quad \text{(a constant).}$$

Integration of this form is a formidable task, however, and this approach is recommended only as a last resort. From this we conclude that:

1. All pipes of interest behave as flat plates at frequencies above 30 kHz.
2. All pipes have ~50–700 modes participating in a band from 10 kHz to near 30 kHz.
3. Use of infinite system/broad band approach makes measurement insensitive to pipe installation geometry, sensor location.

4. Experiments indicate acoustic response of ~10g/psi at high frequency.

A preliminary procedure to use the instrumentation to estimate the leak flow rate through a valve is as follows:

1. Locate an accessible point on the pipe wall approximately two pipe diameters downstream of the test valve. Remove the paint and grind a ¾" diameter area flat for mounting the transducer. Grinding this small area will remove less than an eighth of the pipe wall thickness. Either directly epoxy the accelerometer to the pipe wall or silver braze a mounting pad to the pipe wall and thread the accelerometer to the pad.

2. Connect the accelerometer to the signal conditioning and readout module. Measure and record the RMS or mean-squared voltage. Either measure or otherwise obtain average upstream and downstream pressures. Determine the inside diameter and wall thickness of the pipe downstream of the valve.

3. Use equation (5) to calculate the acoustic sound pressure and then equations (1)–(4) and/or FIG. 2 to calculate the valve leak flow rate.

The computation of leak flow rate can be made using the above equations or from charts based on these equations. Alternatively, software algorithms based on these equations may be programmed into the instrument 23 (illustrated in more detail in FIG. 7) which would accept raw data inputs and calculate and store leak flow rate and other parameters.

Measurement of pipe wall vibration downstream of a closed pipeline valve using the apparatus and procedures described allows an estimate of leak rate accurate to within a factor of two or three. This accuracy is the best possible because of the undefinable effects of effective orifice diameter and background flow noise. It is adequate for making economic decisions regarding the timing on leak repairs.

Having thus described the invention in its preferred embodiment, it will be clear that modifications may be made without departing from the spirit of the invention. Also the language used to describe the inventive concept and the drawings accompanying the application to illustrate the same are not intended to be limiting on the invention rather it is intended that the invention be limited only by the scope of the appended claims.

We claim:

1. A process for measuring the fluid flow rate of a lead flowing through a valve when closed comprising, providing a first pipe having fluid flowing in said pipe, providing a valve which is open connected in fluid communication with said first pipe, providing a second pipe to receive said fluid flowing from said first pipe through said valve, closing said valve, calculating a value of the magnitude of a leak of said fluid flowing into said second pipe through said closed valve solely by measuring one or both of (1) the vibrations of said second pipe caused by acoustic pressure waves in said fluid inside said second pipe or (2) the acoustic pressure waves in the fluid inside said second pipe, as leak measurement data.

2. The process of claim 1 including providing previously obtained leak measurement data from other valves and pipes, comparing said measured vibrations or pressure waves in said second pipe with said provided leak measurement data to determine the magnitude of said leak into said second pipe.

3. The process of claim 2 including measuring said leak measurement data at an acoustic pressure wave frequency above about 30 kHz.

4. The process of claim 3 including inserting a probe into the second pipe interior to make said measurement of acoustic pressure waves in said second pipe.

5. The process of claim 3 including making said measurement of pipe vibrations by measuring the vibrations of the sidewall of said second pipe.

6. The process of claim 1 including making said measurement in said second pipe at an acoustic pressure wave frequency above about 30 kHz.

7. The process of claim 6 including inserting a probe into the second pipe interior to make said measurement of acoustic pressure waves in said second pipe.

8. The process of claim 6 including making said measurement of pipe vibrations by measuring the vibrations of the sidewall of said second pipe.

9. The process of claim 1 including inserting a probe into the second pipe interior to make said measurement of acoustic pressure waves in said second pipe.

10. The process of claim 1 including making said measurement of pipe vibrations by measuring the vibrations of the sidewall of said second pipe.

11. Apparatus for determining the magnitude of a leak of fluid from a first pipe flowing through a closed valve into a second pipe comprising, a measuring instrument to detect acoustic pressure waves from fluid leaking into said second pipe, means in said instrument for measuring acoustic pressure waves only above about 30 kHz, means for calibrating said instrument with previously obtained data for testing of leaking fluid of a specific composition, said previously obtained that including data from (1) a third pipe having a specific wall thickness, (2) specific fluid pressures on each side of a second leaking valve between said third pipe and a fourth pipe, (3) acoustic wave measurement at a site which is a specific distance along said fourth pipe from said second valve, and (4) a specific inside diameter of said fourth pipe between said second valve and the acoustic wave measurement site, said calibrating means including an algorithm programmed into said instrument to receive said previously obtained data, and means for calculating and outputting from said instrument the magnitude of said fluid leaking through said valve.

12. The apparatus of claim 11 wherein the measurement of acoustic waves is in the range of about 30–40 kHz.

13. The apparatus of claim 11 wherein said means in said instrument for measuring measures the vibrations at the exterior surface of said second pipe.

14. A test instrument mounted to report data indicating the magnitude of a fluid leak flowing from a first pipe through a closed valve into a second pipe, comprising, means for giving a signal in response to the magnitude of acoustic pressure waves caused by fluid leaking through said valve into said second pipe, means for calibrating said instrument with previously obtained data for testing of leaking fluid of a specific composition, said previously obtained data including data from (1) a third pipe having a specific wall thickness, (2) specific fluid pressures on each side of a leaking second valve between said third pipe and a fourth pipe, and (3) a specific inside diameter of said fourth pipe, and means for calibrating said instrument to give said signal only for an acoustic pressure wave frequency above about 30 kHz, means for calculating and reporting the magnitude of said fluid leaking through said valve.

15. The test instrument of claim 14 wherein said instrument includes a probe projecting through the wall of said second pipe to receive acoustic pressure waves emanating from the leak flowing through said valve.

16. The test instrument of claim 14 wherein said instrument includes a probe mechanically attached to the external surface of the wall of said second pipe.

17. The test instrument of claim 16 wherein said mechanical attachment is by an adhesive.

18. The test instrument of claim 16 wherein said mechanical attachment comprises a block which is silver soldered to the external surface of a wall of said second pipe.

19. The test instrument of claim 18 wherein the surface of said second pipe side wall is ground flat to accommodate a juxtaposed planar surface of said block.

20. The test instrument of claim 18 wherein the surface of said block juxtaposed to the second pipe surface is configured to accommodate the curved second pipe surface to provide a uniform spacing between said juxtaposed surfaces.

* * * * *